June 7, 1927.
T. J. FAY
1,631,803
VEHICLE
Filed Dec. 5, 1925
2 Sheets-Sheet 2
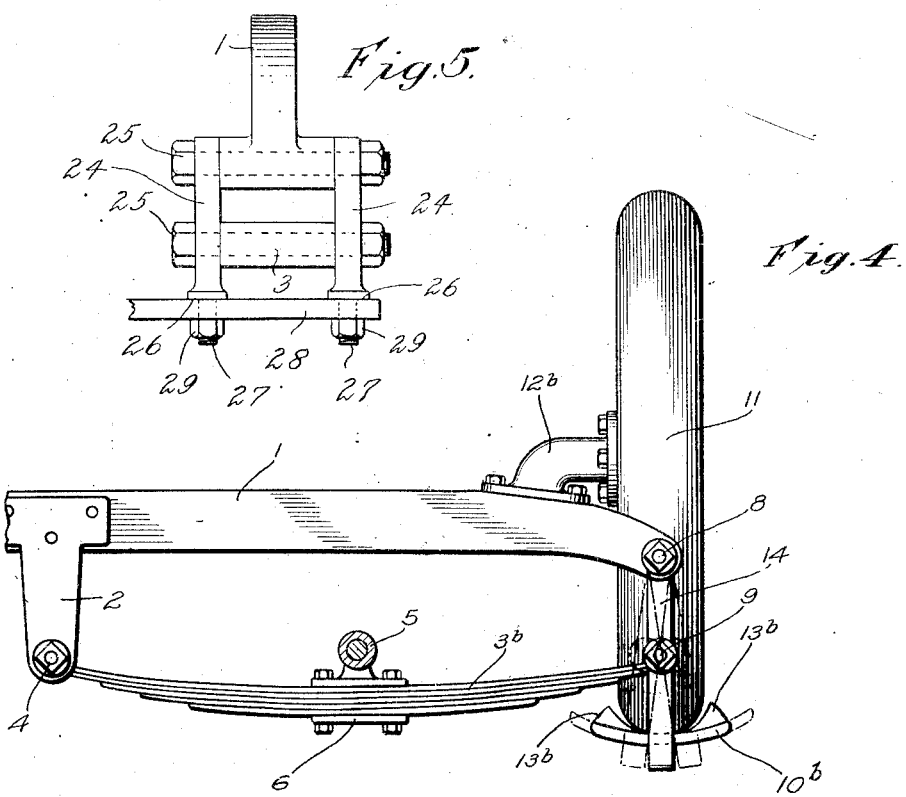
INVENTOR
THOMAS J. FAY
BY
Stockbridge & Borst
ATTORNEYS.

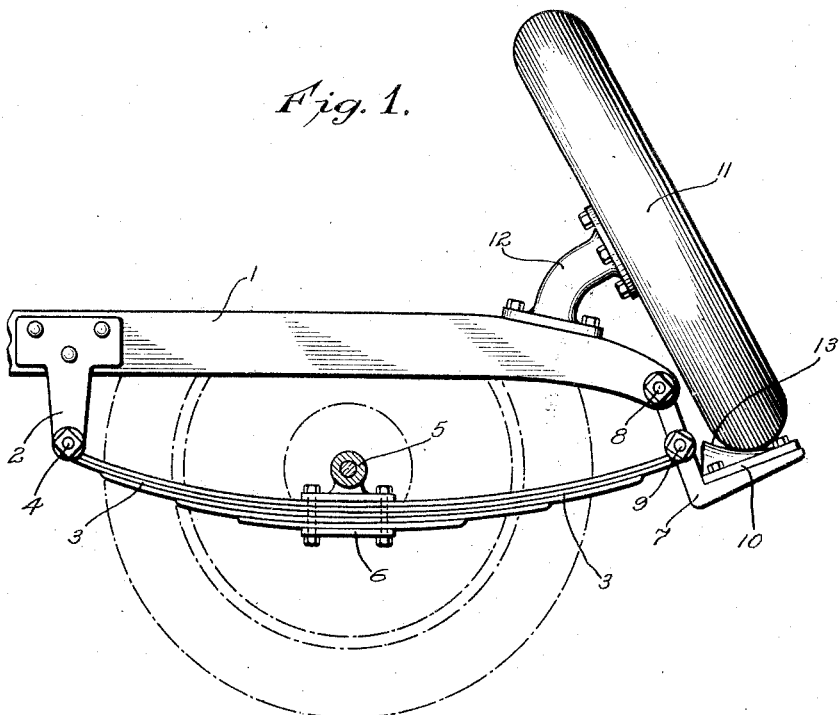
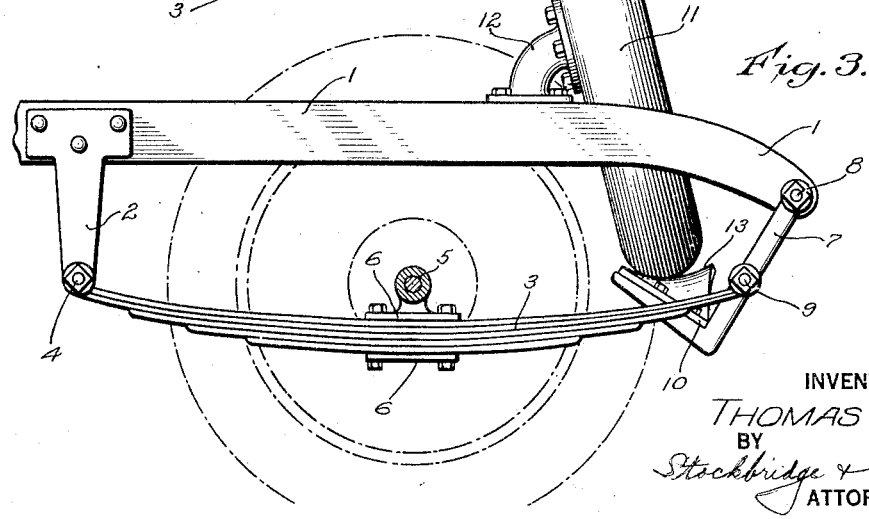

Patented June 7, 1927.

1,631,803

UNITED STATES PATENT OFFICE.

THOMAS J. FAY, OF BROOKLYN, NEW YORK.

VEHICLE.

Application filed December 5, 1925. Serial No. 73,397.

This invention relates to vehicles and particularly to the control of the relative movements between the chassis frame and axle. Various attempts have been made to control such movements, but prior devices of other inventors have been unsatisfactory, in that if made effective in their control, they so restricted such movements that a vehicle, so equipped, was not easy riding. Such prior devices, however effective they may be, fall short of obtaining the most desirable results owing to the fact that they restrict desirable relative motion between the chassis frame and axle and abruptly snub such action as well as controlling the undesirable motion. In other of such devices complex or delicate mechanisms have been required and were difficult to adapt or apply to existing designs of vehicles without material and expensive changes therein. An ideal vehicle is one in which the spring suspension is sensitive sufficiently to absorb the minor shocks, and which will also prevent bouncing and excessive and sudden relative movements of the chassis frame and axle in traveling over relatively rough roadways.

An object of this invention is to provide an improved vehicle construction with which all of the advantages of the usual spring suspension may be obtained, and the maximum of riding comfort obtained; with which the relative movements of the frame and axle will be effectively controlled and sudden and violent movements of the chassis frame prevented in a simple and effective manner; which will require a minimum of change in existing designs of vehicles; in accordance with which existing vehicles may be equipped for this control in a simple and rapid manner; and which may utilize effectively the usual spare tire or wheel without limiting its usefulness as a reserve tire or wheel in case of punctures or tire trouble; and which will be relatively simple, effective, and inexpensive.

Various other objects and advantages will be apparent from the following description of several embodiments of the invention, and the novel features will be particularly pointed out hereinafter in connection with the appended claims.

In the accompanying drawing:—

Fig. 1 is a side sectional elevation of a vehicle constructed in accordance with the invention, and illustrating one embodiment of the invention;

Fig. 2 is a rear elevation of the same;

Fig. 3 is a side sectional elevation of a vehicle also constructed in accordance with the invention and illustrating a further embodiment thereof;

Fig. 4 is a similar elevation showing still another embodiment of the invention;

Fig. 5 is an end elevation of a portion of the same but illustrating a further embodiment of the invention.

Referring particularly to Figs. 1 and 2, the chassis frame 1 is provided with a depending bracket 2 at each side. A spring element 3 is disposed at each side of the vehicle, and each at one end is pivotally connected by a pin 4 to the corresponding bracket 2. Each element 3 is also connected at a point intermediate of its length to the axle 5 in the usual manner, such as by the usual clamping device 6.

The usual shackle elements connecting the other ends of the spring elements 3 and the frame 1 are replaced by L-shaped shackle members 7, these elements 7 each having one arm serving as a link connecting the free end of a spring element 3 and the frame. Thus the free end of one arm of each shackle element 7 is pivotally connected by the shackle bolt or pin 8 to the chassis frame, and at a point intermediate the length of that arm by the shackle pivot pin or bolt 9 to the free end of the adjacent spring element 3, so that the element 7 will serve as a suspending shackle or swinging link connecting the spring element and frame.

The other arms of the elements 7 are connected by a plate or bar 10 which extends across the vehicle and beneath an inflated spare pneumatic tire 11. The tire 11 is removably carried upon a suitable support 12 that is in turn mounted upon the chassis frame 1, intermediate the sides of the vehicle. The bar or plate 10 is normally in close proximity to and preferably in contact with the tire 11, so as to engage with the tire upon relative movements of the frame and axle. Whenever the frame and axle approach one another or separate, the angular elements 7 will be swung, in a direction forwardly and rearwardly of the vehicle, to a limited extent depending upon the extent of relative movement between the frame and axle, and during said relative movement the bar 10 will engage with the tire. The tire, therefore, resists such movement and has a very effective control upon the action of the spring element 3.

Preferably the portion of the member 10 which contacts with the tire 11 is inclined to its direction of motion, that is, its motion during relative movement of the frame and axle, so as to be wedged more or less beneath the tire during such movements. It has been found that this wedge-like action is particularly effective in controlling and smoothing out such movements, without sudden or violent shocks or jars to the occupants of the vehicle. While the abutment surface is shown as inclined only at one side of the tire, it will be obvious that it may also be inclined at the other side of the tire so that movements in both directions of the angular element 7 will be resiliently resisted by the tire and member 10. Where the bar or member 10 is formed by a flat plate, as shown in Figs. 1 and 2, the inclined abutment surface 13 thereon may be readily obtained by forming or stamping that portion of the member 10 to the desired shape, in a manner well known in the metal working art.

In Fig. 3 a somewhat similar arrangement is shown, except that the free angular ends of the element 7 are turned inwardly instead of outwardly, and the arms of the angular elements which replace the shackle previously used are inclined downwardly and toward the other end of the vehicle, instead of outwardly and downwardly as in Figs. 1 and 2. The construction and operation are otherwise the same as in Figs. 1 and 2 and the parts are correspondingly designated.

In Fig. 4 the invention is illustrated as applicable to vehicles having a spring suspension of the type in which usual shackle elements are normally in a substantially vertical position. In this embodiment parts corresponding to those of Figs. 1 to 3 are similarly designated if identical, and if only slightly modified by similar characters provided with an exponent "b". The angular elements 14, which correspond to the elements 7 of Figs. 1 to 3, each have an arm connected to a swinging link between the spring suspension element and the chassis frame and have their other angular ends extending toward one another. An abutment member 10$^b$ connects the free angular ends of the elements 14 and extends beneath an inflated spare pneumatic tire 11 which is removably carried by a bracket 12$^b$ which in turn is carried by the frame 1.

The abutment member 10$^b$ is provided, intermediate of its ends, with inclined abutment surface portions 13$^b$ located upon opposite sides of the tire, forwardly and rearwardly, so that as the angular elements 14 swing forwardly and rearwardly, that is lengthwise of the vehicle, the inclined abutment surfaces 13$^b$ will be wedged beneath the tire to various extents. These swinging movements are, therefore, resiliently resisted by the tire and it has been found that such resilient opposition effectively controls the relative movements of the frame and axle, smoothing out all sudden jerks and jars and violent relative movements between the frame and axle, and at the same time the spring elements 3$^b$ are free to absorb the minor vibrations substantially unrestricted by the pneumatic tire.

In Fig. 5, I have illustrated a slight modification of the invention, covering particularly the support of the cross bar or member, having the abutment surface, from the shackle elements. In this form of the invention, an end of the chassis frame 1 is connected to the adjacent end of the spring 3 by two shackle elements 24 which are disposed against the inner and outer faces of the end of the chassis frame and connected to the spring and frame by bolts 25 as usual with shackle elements. The shackle elements 24 extend beyond the limits required for their connection of the spring and frame and upon such extensions are provided with collars 26 some distance from the free end 27 which is screw threaded. A cross bar 28, similar to the plate 13, and which may conveniently be a plate, is provided with apertures for receiving the threaded ends 27 of the shackle elements and is confined against the collars 26 of such elements by nuts 29 which are threaded upon the free ends of the shackle elements. The cross bar 28 is supported from both shackle elements which connect adjacent ends, at each side of the vehicle, of the spring and frame. The embodiments of the invention shown in Figs. 1 to 3 may also have the ordinary shackle elements connected between the frame and spring so as to tie them together upon both faces whenever such a result is desired.

Vehicles constructed in accordance with this invention have been found to ride very smoothly at all speeds, regardless of the character of the roadways over which they travel, and when traveling over rough roadways with abrupt ridges or depressions therein, no violent or sudden movements of the frame 1 occur.

It will be obvious that various changes in the details, which have been herein described and illustrated for the purpose of explaining the nature of the invention, may be made by those skilled in the art within the principle and scope of the invention as expressed in the appended claims.

I claim:—

1. In a vehicle having a chassis frame and axle, a suspension element at each side of the chassis frame, each connected at a point intermediate of its ends to the axle, and at one end to the chassis frame, a shackle element connected between the other end of each suspension element and the chassis frame, a member secured to and connecting the shackle devices on opposite sides of the vehicle and having an abutment surface intermediate of its ends, and a resilient device carried by the chassis frame and engaging with said abutment surface, whereby relative movements of the frame and axle will be resisted by said resilient device.

2. In a vehicle, a chassis frame, an axle, a suspension element connected at one end to the frame and at a point intermediate of its length to the axle, a shackle device connecting the other end of the suspension element to the frame so as to provide a swinging link connection therebetween, said shackle device having an abutment surface, and a spare pneumatic tire removably carried by the frame and positioned to be engaged by said abutment surface upon relative movement of said frame and axle, whereby such relative movement will be resisted by said spare pneumatic tire.

3. In a vehicle having a chassis frame having an axle, a suspension element at each side of the chassis, each connected at a point intermediate of its ends to the axle and at one end of the chassis frame, a shackle element connected between the other end of each suspension element and the chassis frame, a member secured to and connecting the shackle devices on opposite sides of the vehicle and having, intermediate of its ends, an abutment surface, and a pneumatic device carried by the chassis frame and engaging with said abutment surface, whereby relative movements of the frame and axle will be resisted by said pneumatic device.

4. In a vehicle having a chassis frame having an axle, a suspension element at each side of the chassis, each connected at a point intermediate of its ends to the axle and at one end of the chassis frame, a shackle element connected between the other end of each suspension element and the chassis frame, a member secured to and connecting the shackle devices on opposite sides of the vehicle and having, intermediate of its ends, an abutment surface, and an inflated spare pneumatic tire removably carried by the chassis frame and engaging with said abutment surface, whereby relative movements of the frame and axle will be resisted by said inflated spare pneumatic tire.

5. In a vehicle, a chassis frame and axle, suspension elements disposed at opposite sides of the frame and each connected at one end to the frame and at a point intermediate of its length to the axle, an angular element for each side of the vehicle, each having an arm pivotally connected to the free end of a suspension element and chassis frame so as to form a swinging link shackle connection between them, a member extending between and connecting the other angular arms of said shackle elements, and a resilient device carried by the frame and engaging with said member intermediate of its ends, whereby relative movements of the frame and axle will be opposed by said resilient device.

6. In a vehicle, a chassis frame and axle, suspension elements disposed at opposite sides of the frame and each connected at one end to the frame and at a point intermediate of its length to the axle, a shackle element for each side of the vehicle, pivotally connected to the free end of a suspension element and chassis frame so as to form a swinging link connection between them, a member extending between and connecting the said shackle elements, and a pneumatic element carried by the frame and engaging with said member intermediate of its ends, whereby relative movements of the frame and axle will be opposed by said pneumatic element.

7. In a vehicle, a chassis frame and axle, suspension elements disposed at opposite sides of the frame and each connected at one end to the frame and at a point intermediate of its length to the axle, an angular element for each side of the vehicle, each having an arm pivotally connected to the free end of a suspension element and the chassis frame, so as to form a swinging link connection between them, a member extending between and connecting the other angular arms of said shackle element, and an inflated spare tire removably carried by the frame and engaging with said member intermediate of its ends, whereby relative movements of the frame and axle will be opposed by said inflated spare tire.

8. In a vehicle, a chassis frame and axle, suspension elements disposed at opposite sides of the frame and each connected at one end to the frame and at a point intermediate of its length to the axle, an angular shackle element for each side of the vehicle, each having an arm pivotally connected to the free end of a suspension element and the chassis frame so as to form a swinging link connection between them, a member extending between and connecting the other angular arms of said shackle elements, and an inflated spare tire removably carried by the frame and engaging with said member intermediate of its ends, whereby relative movements of the frame and axle will be opposed by said inflated spare tire, the portion of said member engaging with the tire having such inclination that it will be wedged beneath the tire upon relative movement between said frame and axle.

9. In a vehicle, a chassis frame, an axle, a suspension element connected at one end to the frame and at a point intermediate of its length to the axle, a shackle device connecting the other end of the suspension element to the frame so as to provide a swinging link connection therebetween, said shackle device having an abutment surface, said abutment surface being oblique to its direction of travel upon relative movement of the frame and axle, and an inflated spare pneumatic tire removably carried by the frame and positioned to be engaged by said abutment surface upon relative movement of said frame and axle, whereby such relative movement will be resisted by said inflated spare pneumatic tire, said oblique abutment surface having a somewhat wedge-like action beneath the tire.

In witness whereof, I hereunto subscribe my signature.

THOMAS J. FAY.